US006348242B1

(12) United States Patent
Daly et al.

(10) Patent No.: US 6,348,242 B1
(45) Date of Patent: *Feb. 19, 2002

(54) METHOD FOR PRODUCING LOW/MEDIUM GLOSS APPEARANCE WITH UV CURABLE POWDER COATINGS

(75) Inventors: Andrew T. Daly, Sinking Spring; Richard P. Haley, Reading; Eugene P. Reinheimer, Wyomissing; Gregory R. Mill, Womelsdorf, all of PA (US)

(73) Assignee: Morton International Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/505,034

(22) Filed: Feb. 16, 2000

(51) Int. Cl.$^7$ .................................................. B05D 3/06
(52) U.S. Cl. ....................... 427/558; 427/195; 427/201; 427/375; 427/393; 427/485
(58) Field of Search .................................. 427/180, 195, 427/201, 375, 389.9, 393, 397, 475, 485, 486, 558

(56) References Cited

U.S. PATENT DOCUMENTS

| 4,242,253 A | * 12/1980 | Yallourakis |
| 5,703,198 A | * 12/1997 | Twigt et al. |
| 6,017,593 A | *  1/2000 | Daly et al. |

FOREIGN PATENT DOCUMENTS

JP      01-256575    * 10/1989

* cited by examiner

*Primary Examiner*—Fred J. Parker

(57) ABSTRACT

Low gloss appearance in a coating derived from UV curable powder coatings can be achieved by using UV curable powder containing crystalline components or blends of crystalline and amorphous components and after heat fusing the powders together, allowing the crystalline components in the coating time to flow out and recrystallize to form a matte low gloss finish at a temperature of about the melting point of the crystalline component before curing with UV radiation.

18 Claims, No Drawings

METHOD FOR PRODUCING LOW/MEDIUM GLOSS APPEARANCE WITH UV CURABLE POWDER COATINGS

FIELD OF THE INVENTION

This invention relates to ultraviolet (UV) radiation curable powder coatings. More particularly, it relates to a method for producing cured coatings with a low to medium gloss appearance from UV curable powder coatings. This invention is an improvement over U.S. Pat. No. 6,017,593, which discloses a method for producing low gloss coatings from UV curable powders.

BACKGROUND OF THE INVENTION

Thermosetting powder coatings have gained considerable popularity in recent years over liquid coatings foe a number of reasons. Powder coatings are virtually free of harmful fugitive organic solvents normally present in liquid coatings, and, as a result, give off little, if any, volatiles to the environment when cured. This eliminates solvent emission problems and dangers to the health of workers employed in coating operations. Powder coatings also improve working hygiene, since they are in dry solid form and have no messy liquids associated with them to adhere to workers' clothes and coating equipment. Furthermore, they are easily swept up in the event of a spill without requiring special cleaning and spill containment supplies. Another advantage is that they are 100% recyclable. Over sprayed powders are normally recycled during the coating operation and recombined with the original powder feed. This leads to very high coating efficiencies and minimal waste generation.

Despite many advantages, powder coatings traditionally have not been used foe coating heat sensitive substrates, such as wood and plastic articles, due to the rather high temperatures demanded for flow and cure. Recently, the powder coating industry has concentrated its efforts on developing low temperature curable powders. These new generation powders permit polymerization or curing at much lower temperatures, reducing the potentially damaging and deforming heat loads imposed on sensitive substrates.

One class of low temperature curable powder recently developed are the UV curable powders. UV curable powders have the ability to flow and cure and produce smoother coatings at much lower temperatures than previously possible with traditional thermosetting chemistry. This is primarily due to the curing reaction being triggered by photo-initiated radiation rather than heat. Typically, UV powders are formulated from solid unsaturated base resins with low Tg, such as unsaturated polyesters, unsaturated co-polymerizable crosslinker resins, such as vinyl ethers, photoinitiators, flow and leveling agents, performance-enhancing additives, and, if necessary, pigments and fillers. It is also common
to replace all or part of the base resins or crosslinkers with crystalline materials to provide powders with lower melt viscosity and better flow out behavior.

During coating operations, UV curable powders are applied to a substrate in the usual fashion, using electrostatic spray techniques. The coated substrate is then heated for as long as it takes to drive out substrate volatiles and fuse the powders into a smooth molten Ad coating. Immediately following fusion, the molten coating is exposed to UV light, which, in an instant, cures and hardens the film into a durable, extraordinarily smooth, attractive coating.

One drawback of UV curable powders is that it is very hard to produce a low gloss (i.e., matte) coating. The coatings formed tend to have a relatively high glossy appearance. For reasons of aesthetic preference, it would be desirable to have UV curable powder coatings which provide low gloss coatings. Gloss reduction can normally be obtained in traditional powder coatings through the introduction of matting agents, such as fillers or waxes, which rise to the surface during curing and cause matting through disruption of the surface of the coating. However, because UV curable powders cure so quickly, there is not adequate time for the fillers and waxes to flocculate to the surface, and they become trapped within the coating. There is reduction in flow in the coating but little matting takes place. Higher amounts of filler or waxes may be used, but this tends to cause the powders to block or cake during normal storage and/or produce coatings with severe orange peel, limiting the amount of gloss reduction that could be attained.

It would be desirable to provide a method for producing cured coatings with a low gloss appearance from UV curable powders without having to employ the cooling down step of U.S. Pat. No. 6,017,593. U.S. Pat. No. 6,017,593 discloses allowing the heat fused coating to cool for a period of at least one minute to recrystallize and form a matte finish prior to UV curing.

SUMMARY OF THE INVENTION

It is, therefore, a primary object of this invention to provide a method for producing cured coatings with a low to medium gloss appearance from UV curable powders.

In accordance with the invention, low gloss coatings having 60° Gardner Haze-Gloss levels of about 50 or below, preferably about 30 or below and medium gloss coatings having a 60° gloss level of above about 50 to 70, are achieved with UV curable powders by including in the powder composition crystalline resins or blends of crystalline and amorphous resins, and then allowing the molten coating time to cure at a temperature of about the melting temperature of the crystalline resins to form a matte finish before curing with UV light to the desired hard, chemical resistant, smooth, low or medium gloss coating film.

It is a related object of this invention to provide a method for producing both medium and low gloss cured coatings from substantially identical UV curable powders.

DETAILED DESCRIPTION OF THE PREFERRED EMBODIMENTS

Throughout this specification, all parts and percentages specified herein are by weight unless otherwise stated. Herein, the resin of the powder coating is considered to be the base resin and crosslinker resin. Levels of other components are given as parts per hundred resin (phr). Further herein, the term "low gloss" or "matte" means gloss levels of about 50 or below on a 60° Gardner-Haze Gloss scale. A medium gloss means gloss levels of about 50 to 70 on a 60° Gardner-Haze Gloss scale.

In UV curable powders, the base resins are typically unsaturated polyesters to impart desired weatherability to the coating. Unsaturated polyesters are formed in a conventional manner from di- or polyfunctional carboxylic acids (or their anhydrides) and di- or polyhydric alcohols. The unsaturation is typically supplied by the carboxylic acid, although it is possible to supply it through the alcohol. Often, monohydric alcohols or monofunctional carboxylic acids (or their esters) are employed for chain termination purposes.

Examples of typical ethylenically unsaturated di- or polyfunctional carboxylic acids (or their anhydrides) include maleic anhydride, fumaric acid, itaconic anhydride, citraconic anhydride, mesaconic anhydride, aconitic acid, tetrahydrophihalic anhydride, nadic anhydride, dimeric methacrylic acid, etc. Maleic anhydride, fumaric acid, or their mixtures are generally preferred because of economic considerations. Often, aromatic and saturated acids are employed in conjunction with the unsaturated acids to reduce the density of the ethylenic unsaturation and provide the desired chemical and mechanical properties. Examples of typical aromatic or saturated di- or polycarboxylic acids (or their anhydrides) include adipic acid, succinic acid, sebacic acid, malonic acid, glutaric acid, cyclohexane dicarboxylic acid, dodecane dicarboxylic acid, phthalic anhydride, isophthalic acid, terephthalic acid, tetrahydrophthalic acid, hexahydrophthalic acid, trimellitic acid, pyromellitic anhydride, etc. Examples of typical monofunctional acids for chain termination include acrylic acid, methacrylic acid, etc.

Examples of typical di- or polyhydric alcohols include ethylene glycol, diethylene glycol, triethylene glycol, propanediol, butanediol, neopentyl glycol, cyclohexanedimethanol, hexanediol, 2-n-butyl-2-ethyl-1,3-propanediol, MP Diol, dodecanediol, bisphenol A, hydrogenated bisphenol A, trimethylol propane, pentaerythritol, etc.

The unsaturated polyester resins can be formulated to have either a crystalline or amorphous microstructure. According to this invention, the resin component of the UV curable powders must contain at least one crystalline resin. The crystallinity not only provides powders with lower melt viscosity and better flow out behavior, but also is critical for producing the desired low gloss coating. It is well known in the art that certain alcohol and acid monomers impart crystallinity to the unsaturated polyesters. For example, symmetrically substituted linear monomers or cyclic monomers or their mixtures are generally used to form crystalline polyesters. Examples of typical dihydric alcohols that are known to promote crystallinity include ethylene glycol, butanediol, hexanediol, and cyclohexanedimethanol. Examples of typical dicarboxylic acids that are known to do the same include terephthalic acid, adipic acid, dodecane dicarboxylic acid, and cyclohexane dicarboxylic acid.

The unsaturated polyester resins most useful herein are solid materials at room temperature, so that they can be easily formulated into non-blocking powders. Further, the preferred resins exhibit virtually no cold flow at temperatures up to about 90° F. for desired long shelf life. They also have a glass transition temperature (Tg) and/or melting point (Tm) below the flow temperature required for preservation of heat sensitive substrates, preferably between about 160° F. and 300° F.

These unsaturated polyester resins typically have a weight average (Mw) molecular weight ranging between about 400 and 10,000, and preferably between about 1,000 and 4,500. The degree of unsaturation is typically between about 2 and 20 wt. %, and preferably between about 4 and 10 wt. %. Furthermore, whether the unsaturated polyester is hydroxyl-functional or acid-functional depends upon the —OH/—COOH molar ratio of the monomer mix. Usually, the hydroxyl-functional resins have a hydroxyl number from about 5 to 100. The acid-functional resins typically have an acid number from about 1 to 80.

The unsaturated polyester resins work best in combination with co-polymerizable crosslinker resins having ethylenic unsaturation, and preferably having two sites of unsaturation per molecule. Examples of typical crosslinker resins include oligomers or polymers having vinyl ether, vinyl ester, allyl ether, allyl ester, acrylate or methacrylate groups. Crosslinkers with vinyl ether groups are generally preferred.

Examples of typical vinyl ether resins include divinyl ether terminated urethanes. These materials are usually available as crystalline resins formed from the reaction of hydroxyl-functional vinyl ethers, such as hydroxybutyl vinyl ether, with crystalline diisocyanates, such as hexamethylene diisocyanate, hydrogenated methylenebis(cyclohexyl) diisocyanate, or biurets or uretdiones thereof. Amorphous vinyl ether terminated urethane resins can also be supplied by reacting non-crystalline isocyanates, such as isophorone diisocyanate, first with polyols, such as neopentyl glycol, and then reacting the product obtained with hydroxy vinyl ethers, such as hydroxybutyl vinyl ether.

Other suitable crosslinkers include resins having acrylate or methacrylate groups, such as dimethacrylate terminated urethanes. Again, these materials are usually crystalline resins formed by reacting hydroxyl-functional (meth) acrylates, such as hydroxyethyl methacrylate and hydroxypropyl methacrylate, with crystalline isocyanates. Amorphous resins may also be made in a similar manner as described for the amorphous vinyl ethers. Allyl ester crosslinkers are also commonly employed, such as the reaction product of allyl alcohol and crystalline or non-crystalline carboxylic acids (or their anhydrides), typically phthalic anhydride. Standard allyl ether crosslinkers include the reaction product of an allyl ether, such as allyl propoxylate, and a hydrogenated methylene diisocyanate.

The crosslinker resins most useful herein are solid materials at room temperature. Of course, if the resins are liquids, as with any of the other materials employed in the UV curable powder, they can be converted to solid by absorption onto inert silica-type filler, such as fumed silica, before use, as is well known in the art.

It will be appreciated by a person of ordinary skill in the art that the relative amounts of unsaturated base resin to unsaturated co-polymerizable crosslinker resin in the UV curable powder coatings will depend on the choice of materials employed. Usually, such materials are employed in stoichiometric equivalent amounts to allow crosslinking to proceed to substantial completion, although excess of either can be used if desired.

In accordance with this invention, to obtain the desired low gloss appearance from UV curable powders, the resin component (base resin plus crosslinker) must contain at least one crystalline resin. Accordingly, the powders may be formulated with crystalline resins alone or blends of crystalline and amorphous resins. The crystalline material is typically supplied by the crosslinker resin, although it is possible to supply it through the base resin. The amount of crystalline resin, whether base resin or crosslinker resin, present in the UV curable powders generally ranges between about 1 and 100 wt. % of the resin component, preferably above about 15% and most preferably between about 20 and 50 wt. %, the balance, if any, being amorphous resin.

Standard free-radical photoinitiators are also incorporated in the UV curable powders to effect the radiation-triggered cure. Examples of typical alpha cleavage photoinitiators include benzoin, benzoin ethers, benzyl ketals, such as benzyl dimethyl ketal, acyl iphosphines, such as diphenyl (2,4,6-trimethyl benzoyl) phosphine oxide, aryl ketones, such as 1-hydroxy cyclohexyl phenyl ketone, etc. Examples of typical hydrogen abstraction photoinitiators include Michler's ketone, etc. Examples of typical cationic photoinitiators include diaryliodonium salts and copper synergists, etc. Usually, the amount of photoinitiator present typically ranges between about 0.1 and 10 phr, and preferably between about 1 and 5 phr.

The UV curable powders may also include typical thermal free-radical initiators, such as organic peroxide and azo compounds, in conjunction with the photoinitiators (otherwise referred to herein as "dual cure" powders). This has been found to assist in curing near the substrate, particularly when pigmented, opaque, or thicker film coatings are desired. Examples of typical peroxide and azo initiators include diacyl peroxides, such as benzoyl peroxide, azobis (alkyl nitrile) peroxy compounds, peroxy ketals, such as 1,1-bis(t-butyl peroxy)-3,3,5-trimethylcyclohexane, peroxy esters, dialkylperoxides, hydroperoxides, ketone peroxides, etc. If employed, the amount of thermal initiator present typically ranges between about 0.1 and about 10 phr, and preferably between about 1 and 5 phr.

Standard catalysts may also be employed to increase the crosslinking rate, such as transition metal compounds based on a fatty acid or oil, or tertiary amines. Cobalt soaps, such as cobalt octoate, cobalt neodecanoate, cobalt naphthenate, and cobalt octadecanoate, are especially preferred. If employed, the amount of catalyst present is typically less than about 1.0 phr, and preferably ranges between about 0.1 and 0.5 phr.

Common additives such as pigments and fillers, flow control agents, dry flow additives, anticratering agents, surfactants, texturing agents, light stabilizers, etc., can also be used, as known to those skilled in the art. If desired, matting agents, such as polyethylene waxes, oxidized polyethylenes, polyamides, and TEFLON, can also be employed, although this invention makes them generally redundant.

The UV curable powders employed in this invention typically contain from 0 up to about 120 phr of fillers and/or pigments, depending on desired film opacity and coloration. Examples of typical fillers include calcium carbonate, barium sulfate, wollastonite, mica, china clay, diatomaceous earth, benzoic acid, low molecular weight nylon, etc. Examples of typical pigments include inorganic pigments, such as titanium dioxide, etc., and organic pigments, such as carbon black, etc. In this invention, it has been found that the fillers and pigments also serve as nucleating agents, providing nucleating sites for recrystallization of the crystalline resins. This, in turn, facilitates the formation of the desired low gloss finish.

The other common additives are typically present in a total amount of up to about 15 phr. Examples of typical flow control agents include acrylic resins, silicone resins, etc. Examples of typical dry flow additives include fumed silica, alumina oxide, etc. Examples of typical anticratering agents include benzoin, benzoin derivatives, low molecular weight phenoxy and phthalate plasticizers, etc. Examples of typical surfactants include acetylenic Adiol, etc. Examples of typical texturing agents include organophilic clays, crosslinked rubber particles, multiple crosslinkers, etc. Examples of typical light stabilizers include hindered amines, hindered phenols, etc.

The UV curable coating powders employed in this invention are produced in the usual manner. The components are dry blended together, and then melt blended in an extruder with heating above the melting point of the resin. The extruded composition is rapidly cooled and broken into chips, and then ground with cooling, and, as necessary, the particulates are sorted according to size. Average particle size is typically between about 20–60 microns. Gaseous or supercritical carbon dioxide may be charged to the extruder to lower extrusion temperatures. This is particularly desirable with powders containing crystalline resins. These resins tend to experience drastic reductions in viscosity above their melting point, which, in turn, undesirably reduces the amount of shearing and mixing action occurring in the extruder.

Once the UV curable powders containing the crystalline resins are produced, they are ready for application onto a substrate to be coated.

The UV curable powders are applied in the usual fashion, e.g., electrostatically, to a substrate to be coated. Usually electrostatic spray booths are employed which house banks of corona discharge or triboelectric spray guns and recirculators for recycling over sprayed powders back into the powder feed.

Next, the powders are exposed to sufficient heat to fuse (i.e., melt) and flow out the powders into a continuous, smooth, molten film. The substrate may be pre-heated at the time of application to a temperature of about 200° F. for about 10 minutes and/or subsequently (post-heated) to effect heat fusion and film formation. Heating is performed in infrared, convection ovens, or a combination of both. When coating heat sensitive substrates, such as wood articles, pre-heat and post-heat steps are normally employed to enable faster melt and flow out. With plastic articles, only a post-heat step is usually performed to limit heat exposure and avoid plastic deformation.

Furthermore, when forming low gloss coatings with dual cure powders, care must be taken during heat fusion to minimize thermal curing from taking place. Otherwise, the crosslinker resin will co-polymerize with the base resin and thus prevent the crystalline resin component from recrystallizing, which action is needed to produce low gloss coatings, as will be explained below. Accordingly, with dual cure powders, during heat fusion, the melt and flow out temperature should be kept below the activation temperature of the thermal initiator.

During heat fusion, the UV curable powders employed in this invention have the ability to melt and flow out into smooth films very rapidly (e.g., 5–190 seconds) at very low melting temperatures (e.g., 160–300° F.). The heat load on the substrate during coating is thereby significantly reduced, making these powders especially suited for coating heat sensitive substrates. Usually, the flow viscosity is also very low (e.g., 100–4,000 cone and plate) which helps to produce extraordinarily smooth coatings. Further, heat fusion is allowed to proceed for as long as it takes to outgas all substrate volatiles, which prevents surface defects, such as blisters, craters, and pinholes, from forming during curing. The low cure temperature also helps to reduce substrate outgassing and resultant degradation.

Low and medium gloss is achieved by allowing the heat fused UV curable coating containing the crystalline component(s) time to flow out at a temperature of about the melting temperature of the crystalline component and recrystallize to form a coating with a matte finish before curing with UV light. The flow out temperature range is from about 175° F. to about 225° F., preferably from about 200° F. to about 210° F. This allows the crystalline resins time to reorient in the crystal lattice which forms the low/medium gloss coating. Such processing is highly unusual.

Conventional wisdom would lead one skilled in the art to believe that once the solid resins are allowed to matte, i.e., recrystallize, they would be too immobile to be able to crosslink. Accordingly, one skilled in the art would not expect that full cure could be achieved with recrystallization before curing with radiation. Nevertheless, the present inventors have unexpectedly found that not only can the desired full cure be attained, but also a low or medium gloss coating can be produced. The recrystallization also levels the coating, thereby eliminating the orange peel effect. The net result is that a surprisingly hard, chemical resistant, smooth, low or medium gloss coating is produced.

Thereafter, the coating having the desired matte finish is exposed under a standard UV light source, such as standard medium pressure mercury-, iron doped mercury-, and/or gallium doped mercury-vapor lamps, e.g., 600-watt Fusion H-, D- and/or V-lamps, respectively, to rapidly cure the coating films into smooth hardened finishes. Electron beam radiation may be used instead of UV radiation, if desired. Hardening of the coating takes between about 1 millisecond and 10 seconds, and typically less than about 3 seconds. The coating thickness that can be obtained with this method is typically between about 0.5 and 25 mils, and more commonly between about 1 and 10 mils. Even pigmented coatings can be fully cured by this method.

The glossiness of the cured coating (measured on a Gardner Haze-Gloss scale) can preferably be reduced to about 50 or below, and most preferably about 30 or below, using the method of this invention.

The UV curable powder coatings employed in this invention are particularly suited for heat sensitive substrates. They are also suited for traditional heat resistant substrates. Examples of typical heat sensitive substrates include natural wood, such as hardwood, hard board, laminated bamboo, wood composites, such as particle board, electrically conductive particle board, high, medium or low density fiber board, masonite board, laminated bamboo, and other substrates that contain a significant amount of wood. These substrates may be filled or primed with UV liquids, powder primers, or solvent- or waterborne coatings to improve smoothness and reduce the required film builds. Other heat sensitive substrates include plastics, such as ABS, PPO, SMC, polyolefins, polycarbonates, acrylics, nylons and other copolymers which usually will warp oroutgas when coated and heated with traditional heat curable powders, along with paper, cardboard, and composites and components having a heat sensitive aspect, etc. Examples of typical heat resistant substrates, include metal, steel, glass, ceramic, carbon and graphite.

In summary, this invention provides a method for producing either medium or low gloss coatings using the same UV curable powders. More specifically, it provides a method for producing low gloss coatings from UV curable powders. The method is not limited to the aforesaid described UV curable powder coatings, which are merely exemplary, but describes a method applicable to all types of UV curable powder coatings containing crystalline resins which tend to produce high gloss films when processed in a conventional manner. The most surprising aspect of this invention is that once the heat fused powders have been allowed to recrystallize and form a matte finish, one skilled in the art would not expect that full cure could be achieved.

This invention will now be described in greater detail by way of specific examples.

EXAMPLE 1

Production of a Low/Matte Gloss Coating from UV Curable Powders

The following ingredients were blended together in the given manner to produce a UV curable powder coating capable of forming either a low or medium gloss finish after curing depending on the UV processing employed.

| INGREDIENTS | PHR |
|---|---|
| DRY BLEND UNTIL HOMOGENEOUS | |
| URALAC XP 3125[1] (Non-Crystalline) | 80 |
| ZW 3307P[2] (Crystalline) | 20 |
| LUCERIN TPO[3] | 2.0 |
| IRGACURE 651[4] | 1.0 |
| RESIFLOW L67[5] | 0.6 |
| CHARGE TO EXTRUDER AND EXTRUDE AT MELT TEMPERATURE OF 180° F. | |
| AIR COOL AND BREAK INTO CHIPS THEN ADD | |
| Aluminum Oxide C[6] | 0.2% |
| CHARGE TO MILL AND GRIND TO POWDER SCREEN TO -140 MESH | |

Table Footnotes
[1]URALAC ® XP 3125 is a solid, amorphous, unsaturated polyester resin based on fumaric acid, terephthalic acid, and 1,6-hexanediol, sold by DSM Resins.
[2]ZW ® 3307 is a solid, crystalline, divinyl ether terminated urethane crosslinker resin based on hexamethylene diisocyanate and 4-hydroxybutyl vinyl ether, sold by DSM Resins. (By itself, this resin has a melting point of about 223° F. and recrystallization point of about 176° F.)
[3]LUCERIN ® TPO is a photoinitiator composed of diphenyl (2,4,6-trimethyl-benzoyl) phosphine oxide, sold by BASF.
[4]IRGACURE ® 651 is a photoinitiator composed of acetophenone, sold by CibaGeigy.
[5]RESIFLOW ® is a polyacrylate flow control agent, sold by Estron Chemical.
[6]Aluminum Oxide C is a dry flow additive composed of aluminum oxide, sold by Degussa.

The above formulation was coated on a ¾ inch stained oak substrate by the following method. First, the oak substrate was pre-heated in a convection oven for about minutes under sufficient heat to obtain a surface temperature of about 200° F. Then, the above UV curable powder formulation was applied electrostatically onto the pretreated substrate with a Nordson 100 KV Corona Gun. Next, the applied powders were fused by placing the substrate back into the convection oven and the fused coating lee was allowed to flow out at about 200° F. for about 5 minutes into a continuous smooth molten coating film. The surface temperature attained at this point was about 180–190° F. Thereafter, the coating was radiation cured by conveying the sheet through a Fusion UV oven housing a 600-watt V-lamp (400–420 nm) at about 20 ft/min for about a 1 second exposure.

Optionally, prior to the pre-heating step the substrate can be coated with a standard waterborne spray coating (MorPrep™ 1P 9902, sold by Morton International). The coating can be dried on the substrate using compressed air and wiped with a clean cloth.

Performance results of the cured coatings are given in the Table below.

| PROPERTIES | Medium Gloss |
|---|---|
| Thickness | 1.7–2.7 mils |
| 60° Gloss | 26–44 |
| Smoothness | Slight Orange Peel |
| Crosshatch Adhesion | 5B |
| MEK Resistance (50 double rubs) | 5 No Rub Off |
| Pencil Hardness (mar/gouge) | F2N/2H |

Production of a Low/Matte Gloss Coating from UV Curable Powders

The following ingredients were blended together in the same manner as Example 1.

| INGREDIENTS | PHR |
| --- | --- |
| URALAC XP 3125 (Non-Crystalline) | 70 |
| ZW 3307P (Crystalline) | 30 |
| LUCERIN TPO | 2.0 |
| IRGACURE 651 | 1.0 |
| RESIFLOW L67 [1] | .6 |

The above formulation was coated on a ¾ inch stained oak substrate and id processed in the same manner as provided in Example 1 to obtain a matte or low gloss finish.

Performance results of the cured coating is given in the Table below.

| PROPERTIES | (Low Gloss) |
| --- | --- |
| Thickness | 2–3 mils |
| 60° Gloss | 8 |
| Smoothness | Moderate Orange Peel |
| Crosshatch Adhesion | 5B |
| MEK Resistance | 5 |
| (50 double rubs) | No Rub Off |
| Pencil Hardness | H/4H |
| (mar/gouge) | |

From the above examples it can readily be seen that following the present Invention results in a low/medium matte gloss coating without the necessity for applying the cooling step of U.S. Pat. No. 6,017,593. Further, the method of the present invention results in a more controllable process which makes it easier to induce recrystallization at lower temperatures.

From the foregoing it will be seen that this invention is one well adapted to attain low or medium matte gloss coatings with the other advantages which are apparent and inherent. Since many possible variations may be made of the invention without departing from the scope thereof, the invention is not intended to be limited to the embodiments and examples disclosed, which are considered to be purely exemplary. Accordingly, reference should be made to the appended claims to assess the true spirit and scope of the invention, in which exclusive rights are claimed.

What is claimed is:

1. A method for producing a coating having a low gloss appearance from a UV curable powder coating having a base resin which is an unsaturated polyester, comprising:
   a) applying onto a substrate said UV curable powder coating composition containing from about 1 to 100% crystalline component to generate a low gloss coating;
   b) fusing said UV curable powder coating under sufficient heat to flow out the powders into a continuous coating;
   c) maintaining the heat fused coating at the temperature at about the melting point of the crystalline component to form a matte finish; and,
   d) curing said UV curable powder coating with radiation to a hardened low gloss coating.

2. The method of claim 1, wherein:
   said cured coating has a 60° Gardner-Haze Gloss of about 50 or below.

3. The method of claim 1, wherein:
   said cured coating has a 60° Gardner-Haze Gloss of about 30 or below.

4. The method of claim 1, wherein:
   said substrate is a heat sensitive substrate.

5. The method of claim 1, wherein:
   said UV curable powder composition contains at least about 20 wt. % crystalline component relative to total resin in said powder composition.

6. The method of claim 1, wherein:
   flow out is conducted at a temperature of about 175–225° F.

7. The method of claim 1, wherein the substrate is preheated to about 200° F. for about 10 minutes.

8. The method of claim 6 wherein said heat flow out is conducted at a temperature of about 200° F. to about 210° F. for about 5 minutes.

9. The method of claim 1, wherein said heat flow out is conducted at about 200° F. for about 5 minutes.

10. A method for producing a coating having a low gloss appearance from a TV curable powder coating, comprising:
    a) applying onto a pre-heated substrate a UV curable powder coating composition consisting essentially of:
       i) an unsaturated base resin;
       ii) an unsaturated co-polymerizable crosslinker resin; and,
       iii) a photoinitiator,
          wherein at least 20 wt. % of the resin component i plus ii of said
          powder coating composition is crystalline resin;
    b) fusing said UV curable powder coating with heat;
    c) maintaining the heat fused coating for an effective time at a temperature of about the melting point of said crystalline component so as to obtain a matte finish; and,
    d) curing said coating with UV radiation to a hardened low gloss finish having a 60° Gardner-Haze Gloss of about 50 or below.

11. The method of claim 10, wherein:
    said cured coating has a 60° Gardner-Haze Gloss of about 30 or below.

12. The method of claim 10, wherein:
    said crystalline resin is provided by the i) base resin, the ii) crosslinker resin, or both.

13. The method of claim 10, wherein:
    said i) base resin is an unsaturated polyester resin; and, said ii) crosslinkdr resin is a vinyl ether terminated urethane resin.

14. A method of producing a coating having a low gloss appearance from a UV curable powder coating, comprising:
    a) applying onto a pre-heated substrate a UN curable powder coating composition consisting essentially of:
       i) an unsaturated base resin;
       ii) an unsaturated co-polymerizable crosslinker resin;
       iii) a photoinitiator; and
       iv) a metal catalyst;
          wherein at least 20 wt. % of the resin component i) plus ii) of said powder coating composition is crystalline resin;
    b) fusing said UV curable powder coating with heat;
    c) maintaining the heat fused coating for an effective time at a temperature of about the melting point of said crystalline component so as to obtain a matte finish; and
    d) curing said coating with UV radiation to a hardened low gloss finish having a 60° Gardner-Haze Gloss of about 50 or below.

15. A method of producing a coating having a low gloss appearance from a UV curable powder coating, comprising:
 a) applying onto a pre-heated substrate a UV curable powder coating composition consisting essentially of:
  i) an unsaturated base resin;
  ii) an unsaturated co,polymerizable crosslinker resin;
  iii) a photoinitiator; and
  iv) a thermal initiator;
   wherein at least 20 wt. % of the resin component i) plus ii) of said powder coating composition is crystalline resin;
 b) fusing said UV curable powder coating with heat;
 c) maintaining the heat fused coating for an effective time at a temperature of about the melting point of said crystalline component so as to obtain ¢ matte finish; and
 d) curing said coating with UV radiation to a hardened low gloss finish having a 60° Gardner-Haze Gloss of about 50 or below.

16. A method of producing a coating having a low gloss appearance from a UV curable powder coating, comprising:
 a) applying onto a pre-heated substrate a UV curable powder coating composition consisting essentially of:
  i) an unsaturated base resin;
  ii) an unsaturated co-polymerizable crosslinker resin; and
  iii) a photoinitiator; and
  iv) a metal catalyst;
   wherein at least 20 wt. % of the resin component i) plus ii) of said powder coating composition is crystalline resin;
   wherein said crystalline resin is provided by the i) base resin, the
  ii) crosslinker resin, or both;
 b) fusing said UV curable powder coating with heat;
 c) maintaining the heat fused coating for an effective time at a temperature of about the melting point of said crystalline component so as to obtain a matte finish; and
 d) curing said coating with UV radiation to a hardened low gloss finish having a 60° Gardner-Haze Gloss of about 50 or below.

17. In a method for forming a coating on a substrate including providing a UV curable powder coating, applying the powder coating to said substrate, fusing said powder coating with heat followed by radiation curing the fused powder on said substrate, the improvement comprising:
 a) including at least one crystalline resin in said UV curable powder coating composition; and, b) after fusion is effected, maintaining the fused coating at a temperature at or near the recrystallization temperature for an effective time to allow crystallization and to reduce the gloss of the coating before radiation curing is effected.

18. The method of claim 17, wherein:
said substrate is plastic or wood.

* * * * *